United States Patent
Faulhaber et al.

(10) Patent No.: US 11,940,652 B2
(45) Date of Patent: Mar. 26, 2024

(54) HIGH-POWER ALL FIBER TELESCOPE

(71) Applicant: Lumentum Operations LLC, San Jose, CA (US)

(72) Inventors: Richard D. Faulhaber, San Carlos, CA (US); Martin H. Muendel, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/805,082

(22) Filed: Jun. 2, 2022

(65) Prior Publication Data

US 2022/0299710 A1    Sep. 22, 2022

Related U.S. Application Data

(62) Division of application No. 16/588,838, filed on Sep. 30, 2019, now Pat. No. 11,360,269.

(60) Provisional application No. 62/813,486, filed on Mar. 4, 2019.

(51) Int. Cl.
| | |
|---|---|
| *G02B 6/42* | (2006.01) |
| *B23K 26/06* | (2014.01) |
| *B23K 26/073* | (2006.01) |
| *G02B 6/32* | (2006.01) |
| *H01S 3/08* | (2023.01) |

(52) U.S. Cl.
CPC ............ *G02B 6/32* (2013.01); *B23K 26/0626* (2013.01); *B23K 26/0648* (2013.01); *B23K 26/073* (2013.01); *G02B 6/4206* (2013.01); *G02B 6/4296* (2013.01); *H01S 3/08059* (2013.01)

(58) Field of Classification Search
CPC ................................. G02B 6/42; B23K 26/06
USPC ............................................................. 385/33
See application file for complete search history.

(56) References Cited

U.S. PATENT DOCUMENTS

| | | | | |
|---|---|---|---|---|
| 4,963,143 A | * | 10/1990 | Pinnow ................ | A61B 18/201 606/17 |
| 4,997,250 A | * | 3/1991 | Ortiz, Jr. ................ | G02B 27/09 219/121.75 |
| 5,042,897 A | * | 8/1991 | Meltz ................ | G02B 6/02133 385/37 |
| 5,195,150 A | * | 3/1993 | Stegmueller ......... | G02B 6/4204 385/33 |
| 5,245,682 A | * | 9/1993 | Ortiz, Jr. .............. | G02B 6/4206 385/38 |

(Continued)

FOREIGN PATENT DOCUMENTS

| | | |
|---|---|---|
| CN | 101034189 A | 9/2007 |
| CN | 104136952 A | 11/2014 |

(Continued)

*Primary Examiner* — Kaveh C Kianni
(74) *Attorney, Agent, or Firm* — Harrity & Harrity, LLP (57) ABSTRACT

An optical fiber device may include an optical waveguide to guide a laser output from a first end of the optical waveguide to a second end of the optical waveguide. The optical fiber device may include a fiber telescope optically coupled to the second end of the optical waveguide to modify the laser output. The fiber telescope may include a first graded-index optical element, a first facet of the first graded-index optical element being fused to the second end of the optical waveguide; and a second graded-index optical element, a first facet of the second graded-index optical element being fused to a second facet of the first graded-index optical element.

20 Claims, 7 Drawing Sheets

(56) References Cited

U.S. PATENT DOCUMENTS

| | | | | |
|---|---|---|---|---|
| 5,457,759 A | * | 10/1995 | Kalonji | G02B 6/4203 385/124 |
| 5,477,323 A | * | 12/1995 | Andrews | G01D 5/266 356/477 |
| 6,217,204 B1 | | 4/2001 | Arima | |
| 6,373,868 B1 | * | 4/2002 | Zhang | H01S 3/109 372/19 |
| 6,485,413 B1 | * | 11/2002 | Boppart | A61B 1/07 600/478 |
| 6,839,483 B2 | * | 1/2005 | Reed | A61B 5/0084 385/28 |
| 7,098,871 B1 | * | 8/2006 | Tegreene | G02B 27/01 345/7 |
| 7,099,535 B2 | * | 8/2006 | Bhagavatula | G02B 6/4206 385/124 |
| 7,403,681 B2 | | 7/2008 | Hashizume et al. | |
| 7,920,763 B1 | * | 4/2011 | Shou | G02B 6/32 385/33 |
| 9,250,390 B2 | * | 2/2016 | Muendel | G02B 6/4216 |
| 9,638,873 B2 | * | 5/2017 | Bhagavatula | G02B 6/4214 |
| 9,823,422 B2 | | 11/2017 | Muendel et al. | |
| 10,260,914 B1 | * | 4/2019 | Ippolito | G01D 5/353 |
| 10,432,314 B2 | | 10/2019 | Li et al. | |
| 11,360,269 B2 | | 6/2022 | Faulhaber et al. | |
| 2002/0027712 A1 | * | 3/2002 | Soskind | G02B 27/4216 359/565 |
| 2002/0044359 A1 | * | 4/2002 | Shimmo | G02B 5/1861 359/569 |
| 2002/0057883 A1 | * | 5/2002 | Malone | G02B 6/4232 385/136 |
| 2002/0146202 A1 | * | 10/2002 | Reed | A61B 5/0084 385/34 |
| 2002/0150333 A1 | * | 10/2002 | Reed | G02B 6/3582 385/16 |
| 2003/0133654 A1 | | 7/2003 | Chang | |
| 2003/0165291 A1 | * | 9/2003 | Bhagavatula | G02B 6/262 385/33 |
| 2003/0165292 A1 | * | 9/2003 | Bhagavatula | G02B 6/4203 385/33 |
| 2004/0126059 A1 | * | 7/2004 | Bhagavatula | G02B 6/2552 385/124 |
| 2004/0175073 A1 | * | 9/2004 | Grinderslev | G02B 6/32 385/74 |
| 2004/0208443 A1 | * | 10/2004 | Burkhard | G02B 6/2937 385/34 |
| 2004/0240786 A1 | | 12/2004 | Gafsi et al. | |
| 2005/0069257 A1 | * | 3/2005 | Bhagavatula | G02B 6/262 385/33 |
| 2005/0100276 A1 | | 5/2005 | Hashizume et al. | |
| 2005/0220401 A1 | * | 10/2005 | Jiang | G02B 6/4206 385/124 |
| 2005/0226563 A1 | * | 10/2005 | Jin | G02B 6/262 385/50 |
| 2006/0239605 A1 | * | 10/2006 | Palen | G02B 6/423 385/33 |
| 2008/0219620 A1 | * | 9/2008 | Lindlein | G02B 6/262 385/33 |
| 2009/0220195 A1 | * | 9/2009 | Van Der Keur | G01J 3/021 385/31 |
| 2009/0323076 A1 | * | 12/2009 | Li | G01B 9/02063 356/479 |
| 2010/0189392 A1 | * | 7/2010 | Rockwell | G02B 6/1245 385/28 |
| 2010/0271689 A1 | * | 10/2010 | Jasapara | G02B 6/0288 359/341.1 |
| 2011/0206068 A1 | * | 8/2011 | Tanaka | H01S 3/094015 385/33 |
| 2012/0051084 A1 | * | 3/2012 | Yalin | G02B 6/028 385/33 |
| 2013/0148925 A1 | * | 6/2013 | Muendel | G02B 6/4216 385/27 |
| 2013/0272658 A1 | * | 10/2013 | Floris | G02B 6/3885 29/469 |
| 2013/0287342 A1 | * | 10/2013 | J nior | G02B 6/322 219/121.85 |
| 2014/0185986 A1 | | 7/2014 | Costello, III et al. | |
| 2014/0205236 A1 | * | 7/2014 | Noguchi | G02B 6/32 385/33 |
| 2015/0160468 A1 | * | 6/2015 | Ma | G02B 6/255 359/641 |
| 2015/0205126 A1 | * | 7/2015 | Schowengerdt | G09G 5/003 345/633 |
| 2015/0234195 A1 | * | 8/2015 | Honea | G02B 27/0905 359/618 |
| 2016/0154182 A1 | * | 6/2016 | Noguchi | G02B 6/06 385/96 |
| 2016/0178439 A1 | * | 6/2016 | Freudiger | G01J 3/44 356/301 |
| 2016/0202422 A1 | | 7/2016 | De Jong et al. | |
| 2016/0202430 A1 | | 7/2016 | De Jong et al. | |
| 2016/0341951 A1 | * | 11/2016 | Tearney | G02B 26/103 |
| 2016/0377811 A1 | * | 12/2016 | Goodwill | G02B 6/34 385/24 |
| 2017/0035281 A1 | * | 2/2017 | Takeuchi | H04N 23/56 |
| 2018/0214008 A1 | * | 8/2018 | Yamazoe | A61B 1/00177 |
| 2018/0217411 A1 | * | 8/2018 | Karlsen | B23K 26/064 |
| 2018/0329156 A1 | | 11/2018 | Flaig et al. | |
| 2018/0372633 A1 | * | 12/2018 | Yamazoe | A61B 1/042 |
| 2019/0094469 A1 | * | 3/2019 | Mouri | G02B 27/0994 |
| 2021/0033837 A1 | * | 2/2021 | Dholakia | G02B 21/367 |
| 2021/0041227 A1 | * | 2/2021 | Van Der Mark | G01B 11/24 |

FOREIGN PATENT DOCUMENTS

| | | | | |
|---|---|---|---|---|
| CN | 105680953 A | | 6/2016 | |
| CN | 108292018 A | | 7/2018 | |
| GB | 2385460 A | * | 8/2003 | H01S 3/06791 |
| JP | H08146250 A | | 6/1996 | |
| JP | 2003038568 A | | 2/2003 | |
| JP | 2004246281 A | | 9/2004 | |

* cited by examiner

HIGH-POWER ALL FIBER TELESCOPE

RELATED APPLICATIONS

This application is a divisional of U.S. patent application Ser. No. 16/588,838, filed Sep. 30, 2019 (now U.S. Pat. No. 11,360,269), which claims priority to U.S. Provisional Patent Application No. 62/813,486, filed on Mar. 4, 2019, the contents of each of which are incorporated herein by reference in their entireties.

TECHNICAL FIELD

The present disclosure relates to laser beam delivery and, more particularly, to laser beam delivery using an all fiber telescope.

BACKGROUND

Laser material processing can be used for cutting, drilling, welding, brazing, surface annealing, alloying, hardening, and other applications. An optical fiber can be used to deliver a high-power and/or high-intensity laser beam to a workpiece on which the laser material processing is to be performed. Advantages of laser material processing include high productivity, a non-contact nature of processing, improved quality, and high precision and mobility of a delivery point of the laser beam.

A fiber-delivered laser material processing system typically includes a laser source (e.g., one or more fiber laser modules), an optical coupler, a delivery fiber (typically 10-50 meters in length and included in a delivery cable that is pluggable on both ends), and a processing head. The processing head is an optical assembly that includes a receptacle for the delivery fiber, optics for projecting the laser power, and any components needed for laser-based processing, such as assist-gas ports. In operation, the laser emission is transmitted into the optical coupler unit (e.g., through free space or through a separate optical fiber). The optical coupler unit launches the laser emission into the delivery fiber, and the delivery fiber transmits the laser light to the processing head. The processing head projects the laser light onto a workpiece in association with performing the processing task.

As noted above, the laser source may, in some cases, include one or more fiber laser modules. A typical high brightness individual fiber laser module operates up to a power of, for example, 4 kilowatts (kW) with a beam parameter product (BPP) of approximately 1.0 millimeters-milliradians (mm-mrad). Such individual laser modules typically have output fiber core diameters in the range of, for example, approximately 30-50 microns (μm) with a numerical aperture (NA) less than 0.08. To scale power, multiple individual fiber laser modules can be combined (e.g., using fiber combiners in an L:1 (L>1) configuration) to form a multi-module fiber laser engine. A typical engine operates up to a combined power of, for example, 16 kW with a BPP of approximately 3.0-5.0 mm-mrad. The optical properties of such engines typically have core diameters of, for example, approximately 50-100 μm with NA less than 0.16.

SUMMARY

According to some possible implementations, an optical fiber device may include an optical waveguide to guide a laser output from a first end of the optical waveguide to a second end of the optical waveguide; and a fiber telescope optically coupled to the second end of the optical waveguide to modify the laser output, the fiber telescope comprising: a first graded-index optical element, a first facet of the first graded-index optical element being fused to the second end of the optical waveguide; and a second graded-index optical element, a first facet of the second graded-index optical element being fused to a second facet of the first graded-index optical element.

According to some possible implementations, a laser system may include a laser source to provide a laser output; an optical fiber device comprising: an optical waveguide to guide the laser output; and a fiber telescope to modify the laser output, the fiber telescope being optically coupled to an end of the optical waveguide, and the fiber telescope comprising: a first graded-index optical element, a first facet of the first graded-index optical element being fused to the end of the optical waveguide; and a second graded-index optical element, a first facet of the second graded-index optical element being fused to a second facet of the first graded-index optical element.

According to some implementations, a method may include guiding a laser output from a first end of an optical waveguide to a second end of the optical waveguide; modifying the laser output by a fiber telescope coupled to the second end of the optical waveguide, wherein the fiber telescope comprises a first graded-index optical element and a second graded-index optical element, and wherein the modifying includes at least one of: a magnification of the laser output, a demagnification of the laser output, a shifting of an image plane relative to a caustic waist of the laser output, or beam shaping of the laser output.

According to some implementations, an optical fiber device may include an optical waveguide to guide a laser output from a first end of the optical waveguide to a second end of the optical waveguide; and a fiber telescope optically coupled to the second end of the optical waveguide to modify the laser output, wherein the fiber telescope comprises at least one graded-index optical element, wherein a total length of the at least one graded-index optical element is greater than one-quarter pitch, and wherein a facet of the at least one graded-index optical element is fused to the second end of the optical waveguide.

DETAILED DESCRIPTION

The following detailed description of example implementations refers to the accompanying drawings. The same reference numbers in different drawings may identify the same or similar elements.

As described above, a delivery fiber may connect a laser source (e.g., a single laser module or a laser engine including a plurality of laser modules) to a processing head. The delivery fiber typically terminates with a connector assembly (e.g., a pluggable high power connector) designed to handle the optical properties of the fiber laser being delivered. In general, an endcap (e.g., formed from a high quality glass) is spliced to the delivery fiber to reduce power density (e.g., to avoid damaging an exit facet of the glass). This means that different endcap geometries are needed for use with a single laser module and a laser engine to handle the different optical properties associated with the single laser module and the laser engine. For example, a comparatively shorter endcap may be needed to handle the comparatively higher divergence of the laser engine, while a comparatively longer endcap may be needed to handle the comparatively lower divergence of the single laser module.

Some implementations described herein provide an optical fiber device comprising an optical waveguide to guide a laser output, and a fiber telescope optically coupled to the optical waveguide to modify the laser output. In some implementations, the fiber telescope may include a pair of graded-index optical elements.

The optical fiber device described herein resolves the issue of needing different connector assemblies and fiber endcap geometries for termination of an individual laser module versus a termination of an engine (e.g., comprising multiple laser modules). For example, by using the two graded-index optical elements, an output of an engine may be magnified to increase a spot size and lower an NA at an exit facet of the optical fiber device. The combination of focal lengths of the graded-index optical elements can be chosen to match an NA of a single module laser. This change enables the use of a single length endcap and hence the same mechanical components, tolerances, and so on, for use when making the connector termination of both the module and laser engine delivery fibers, despite their being considerably different laser sources. Likewise a different set of focal length graded-index optical elements can be chosen in order to de-magnify the output of the single laser module output in order to utilize a shorter length endcap.

The optical fiber device described herein also resolves the issue of needing two different optical configurations for a laser processing head for output of an individual laser module versus a termination of an engine. In other words, the optical fiber device described herein allows utilization of both an individual laser module and an engine for a given optical configuration in the processing head.

Figure 1:
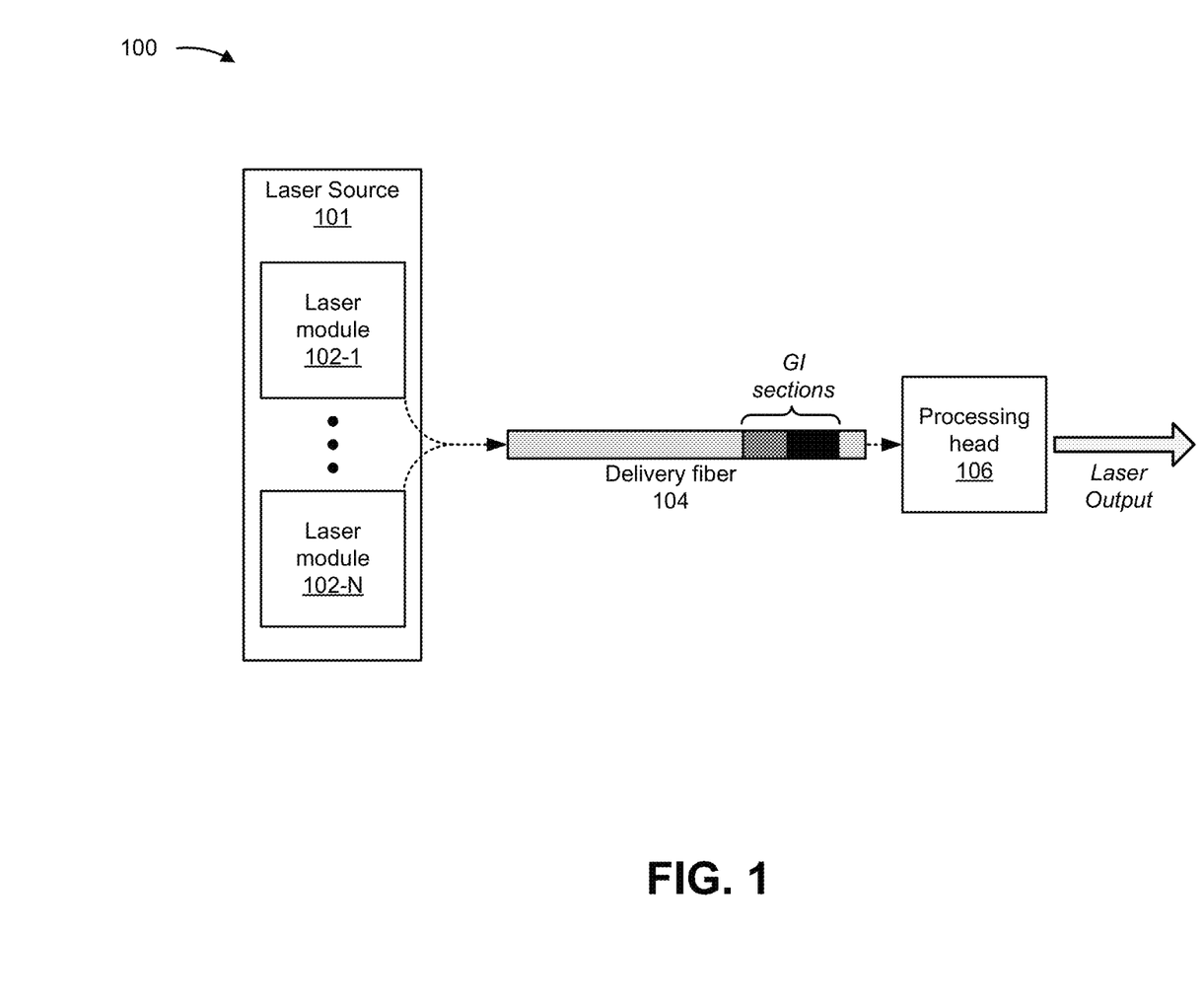
FIG. 1 is a diagram of an example implementation of a laser system described herein.

FIG. 1 is a diagram of an example implementation of a laser system 100. As shown in FIG. 1, laser system 100 may include a laser source 101 comprising one or more laser modules 102 (e.g., laser module 102-1 through laser module 102-N (N≥1)). As further shown, laser system 100 may include a delivery fiber 104 and a processing head 106.

Laser source 101 is a source of a laser output. In some implementations, laser source 101 may include a single individual laser module 102 (i.e., laser source 101 may include only one laser module 102). Alternatively, laser source 101 may include multiple laser modules 102, in some implementations. As described above, laser source 101 may be referred to as a laser engine when laser source 101 comprises multiple individual laser modules 102. Laser module 102 includes a fiber laser module capable of generating a laser output. In some implementations, laser module 102 may operate up to a power of, for example, 4 kW with a BPP of approximately 1.0 mm-mrad. In some implementations, the optical properties of laser module 102 may have a core diameter in the range of, for example, approximately 30-50 μm with an NA less than 0.08. In some implementations, as indicated in FIG. 1, multiple laser modules 102 can be combined to form a multi-module fiber laser engine (e.g., in order to scale power of laser system 100). In some implementations, such a multi-module laser engine comprising multiple laser modules 102 may operate up to a combined power of, for example, 16 kW with a BPP of approximately 3.0-5.0 mm-mrad. The optical properties of such a laser engine may have a core diameter of, for example, approximately 50-100 μm with NA less than 0.16. In some implementations, as shown in FIG. 1, an output of laser source 101 (e.g., an output of the one or more laser modules 102) is optically coupled to (an input end) of delivery fiber 104.

Delivery fiber 104 includes an optical fiber device including an optical waveguide and a fiber telescope. In operation, the optical waveguide of delivery fiber 104 guides a laser output provided by laser source 101, and the fiber telescope modifies the laser output. In some implementations, the modification to the laser output may include magnifying the laser output, de-magnifying the laser output, shifting an image plane (relative to a caustic waist of the laser output), beam shaping, or the like, as described in further detail below. In some implementations, as shown in FIG. 1, an output end of delivery fiber 104 may be optically coupled to processing head 106. Additional details regarding delivery fiber 104 are provided below with regard to FIG. 2.

Processing head 106 includes an optical assembly that includes a receptacle for delivery fiber 104, optics for projecting the laser power, and/or one or more other components associated with laser-based processing. In some implementations, processing head 106 is configured to project a laser output, after modification by delivery fiber 104, onto a workpiece in association with performing a laser processing task (e.g., cutting, drilling, welding, brazing, surface annealing, alloying, hardening, or the like).

In operation of laser system 100, laser emission, provided by the one or more laser modules 102 of laser source 101, is launched (e.g., via an optical coupler unit) into delivery fiber 104. Delivery fiber 104 guides and modifies the laser light, as described herein, and then transmits the modified laser light to processing head 106. Processing head 106 then projects the modified laser light onto a workpiece in association with performing the laser processing task.

The number and arrangement of components shown in FIG. 1 are provided as an example. In practice, laser system 100 may include additional components, fewer components, different components, or differently arranged components than those shown in FIG. 1. Additionally, or alternatively, a set of components (e.g., one or more components) of laser system 100 may perform one or more functions described as being performed by another set of components of laser system 100.

Figure 2:
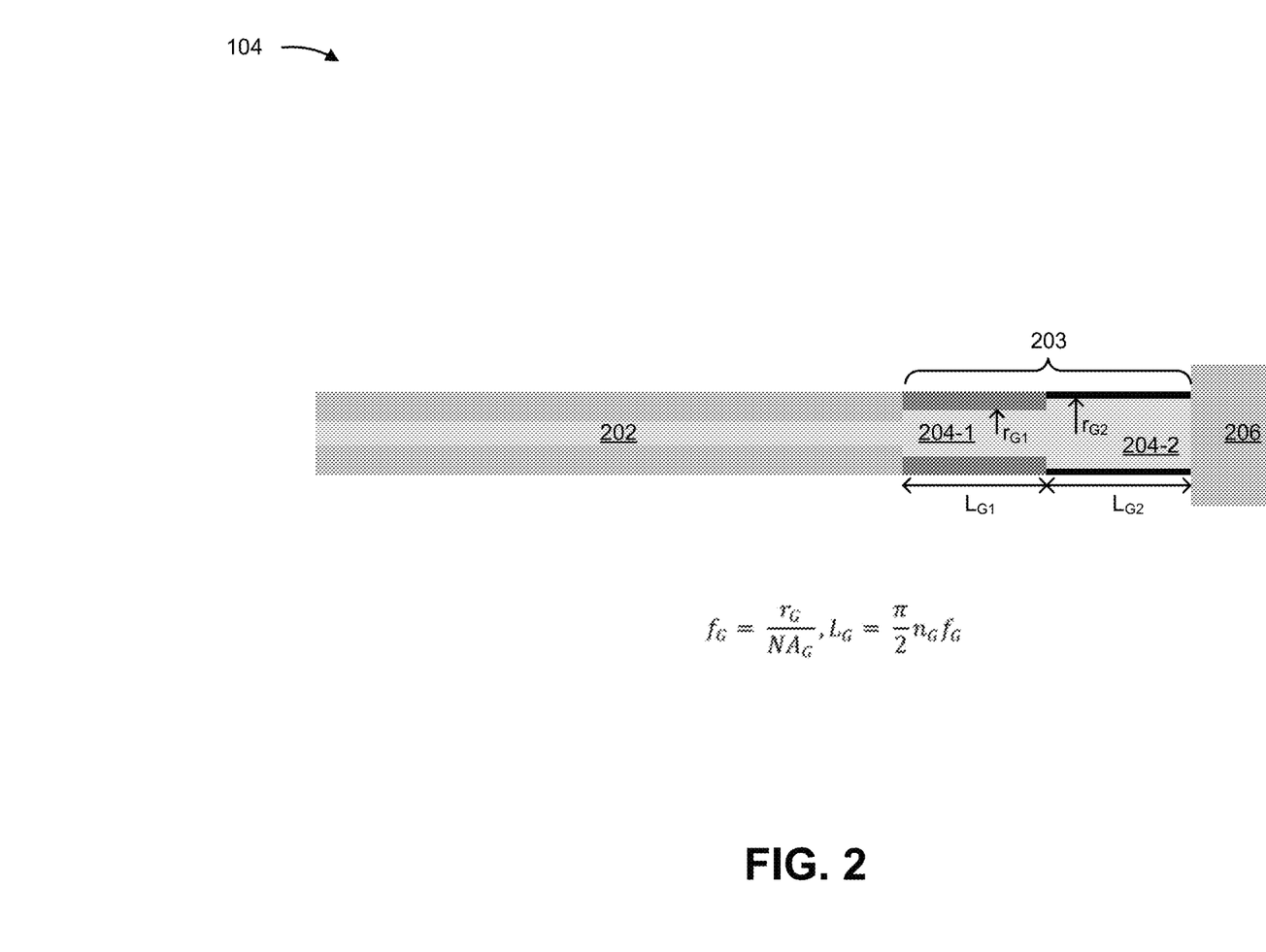
FIG. 2 is a diagram of example components of a delivery fiber included in the laser system of FIG. 1.

FIG. 2 is a diagram of example components of delivery fiber 104 included in laser system 100 of FIG. 1. As shown in FIG. 2, delivery fiber 104 may include an optical fiber device comprising an optical waveguide 202, a fiber telescope 203, and an endcap 206. As shown, fiber telescope 203 may include a set of graded-index optical elements 204 (e.g., graded-index optical element 204-1 and graded-index optical element 204-2).

Optical waveguide 202 includes a waveguide to guide a laser output provided by the one or more laser modules 102 (e.g., from a first end of optical waveguide 202 to a second end of optical waveguide 202). For example, in some implementations, optical waveguide 202 may have a step-index profile (i.e., optical waveguide 202 may be a step-index optical fiber). Generally, optical waveguide 202 may have any profile that is desired to deliver the laser output to the workpiece. For example, optical waveguide 202 may have a step-index core, a ring-doped core, a multi-ring core (e.g., possibly with a central core), a multi-step core, a graded-index core, or the like. As shown in FIG. 2, the second (i.e., output) end of optical waveguide 202 may be optically coupled to a first (i.e., input) end of fiber telescope 203.

Fiber telescope 203 includes an optical fiber device to modify the laser output, as described herein. In some implementations, fiber telescope 203 may include a set of graded-index optical elements 204 including graded-index optical element 204-1 and graded-index optical element 204-2. In some implementations, the set of graded-index optical elements 204 may include a set of graded-index optical fibers (i.e., at least one graded-index optical element 204). In some implementations, as shown in FIG. 2, a first facet (e.g., a facet at an input end) of graded-index optical element 204-1 may be optically coupled (e.g., fused) to the second end of optical waveguide 202. As further shown, a second facet (e.g., a facet at an output end) of graded-index optical element 204-1 may be optically coupled to a first facet (e.g., a facet at an input end) of graded-index optical element 204-2. As further shown, a second facet (e.g., a facet at an output end) of graded-index optical element 204-2 may be optically coupled to a face of endcap 206. In some implementations, graded-index optical element 204-1 and graded-index optical element 204-2 may have an approximately parabolic refractive-index profile. That is, graded-index optical element 204-1 and/or graded-index optical element 204-2 may have a core region with a refractive-index profile that varies smoothly and non-linearly (e.g., quadratically) in a radial direction relative to a fiber axis. (e.g., rather than having a refractive index that changes at a constant rate and/or exhibits steps or sharp changes, as in the case of a step-index optical fiber). For example, the refractive index profile may include a refractive index profile such that if a best-fit is applied to the measured index profile using the rotationally symmetric function $n(r)=n_0(1-2\Delta(r/R)^{\alpha})^{1/2}$, where r is the radial variable, R is the radius of the core or of the region of the core in which a majority of the transmitted power is present (e.g., an 86%-power-enclosed radius), and the best-fit is applied by varying $n_0$, $\Delta$ and $\alpha$, then the exponent $\alpha$ obeys the relation $1.5 \leq \alpha \leq 2.5$ In some implementations, graded-index optical element 204-1 and/or graded-index optical element 204-2 may have a length ($L_{G1}$ and $L_{G2}$, respectively) of approximately 1 mm. Additional details regarding fiber telescope 203 are provided below.

In some implementations, the set of graded-index optical elements 204 of fiber telescope 203 may include more than two graded-index optical elements. In such implementations, using more than two graded-index optical elements 204 may provide flexibility for fiber telescope 203 in generating particular beam sizes, divergences, and/or image plane locations.

In some implementations, the set of graded-index optical elements 204 may include a single graded-index optical element. That is, in some implementations, fiber telescope 203 may including a single graded-index optical element 204. In some implementations, the single graded-index optical element 204 may have a length that is greater than one-quarter-pitch. In some implementations, the length being greater than one-quarter pitches provides movement of an image plane location, modification of a spot size, modification a divergence, and/or the like. In some implementations, the single graded-index optical element 204 may be formed of one monolithic piece of graded-index material, but may act as a telescope including a first graded-index optical element 204 (e.g., with a quarter-pitch length, with a length that is greater than or less than one-quarter pitch (referred to as a non-quarter pitch length)) plus a second graded-index optical element 204 (e.g., with a quarter pitch length or a non-quarter pitch length), with the two graded-index optical elements 204 having a same diameter and graded-index profile.

In some implementations, the total length of the set of graded-index optical elements 204 of fiber telescope 203 may be greater than one-quarter pitch. For example, when the set of graded-index optical elements includes a first graded-index optical element 204-1 and a second graded-index optical element 204-2, a length of the first graded-index optical element 204-1 and/or a length of the second graded-index optical element 204-2 may be one-quarter pitch (e.g., such that a total length of the first and second graded-index optical elements 204 is greater than one-quarter pitch). In some implementations, a length of at least one of the first graded-index optical element or the second graded-index optical element is greater than or less than on one-quarter pitch. In some implementations, the total length of the set of graded-index optical elements 204 of fiber telescope 203 may be less than approximately one half-pitch, such as ⅜-pitch. In some implementations, the set of graded-index optical elements may include at least three graded-index optical elements (i.e., more than two graded-index optical elements 204). In some implementations, at least two of the set of graded-index optical elements 204 may have a same diameter and graded-index profile.

In some implementations, the set of graded-index optical elements may include at least one graded-index element in which the graded-index profile varies as a function of position along the fiber axis, thus causing the effective focal length to vary with position. One method for fabricating a fiber with an axially varying graded-index profile is by fusion-tapering the fiber. A single axially-varying graded-index element can perform similarly to two or more non-varying graded-index elements optically coupled to one another.

Endcap 206 includes an optical element to reduce power density (e.g., to avoid damaging an exit facet of the glass) of the laser output transmitted by delivery fiber 104. In some implementations, endcap 206 may have an anti-reflective (AR) coating to reduce or eliminate reflection of the laser light back into delivery fiber 104. In some implementations, as shown in FIG. 2, endcap 206 may be optically coupled to the second facet of graded-index optical element 204-2.

The number and arrangement of components shown in FIG. 2 are provided as an example. In practice, delivery fiber 104 may include additional components, fewer components, different components, or differently arranged components than those shown in FIG. 2. Additionally, or alternatively, a set of components (e.g., one or more components) of delivery fiber 104 may perform one or more functions described as being performed by another set of components of delivery fiber 104.

In some implementations, graded-index optical element 204-1 and graded-index optical element 204-2 may be quarter-pitch graded-index lenses. In other words, graded-index optical elements 204-1 and 204-2 may be fabricated (e.g., cleaved, polished, or the like) to be the length of one-quarter (¼) pitch, in some implementations. In some implementations, the ¼ pitch graded-index optical elements 204 may act as lenses with focal lengths $f_{G1}$ and $f_{G2}$, respectively, as defined by properties of the graded-index material (e.g., a radius, $r_{G1}$ and $r_{G2}$, respectively, and an $NA_{G1}$ and an $NA_{G2}$, respectively, as defined in FIG. 2). Here, graded-index optical elements 204-1 and 204-2 (acting as graded-index lenses) operate as an all-fiber telescope with magnification of the laser spot size by a factor of f2/f1. Here, the laser spot size is magnified when f2>f1, or demagnified when f2<f1. The modification by graded-index optical elements 204 may be used to modify the properties of the laser output during transmission through delivery fiber 104. In some implementations, as indicated in FIG. 2, a focal length $f_G$ and a length $L_G$ of a given graded-index optical element 204 may be determined as follows:

$$f_G = \frac{r_G}{NA_G}, L_G = \frac{\pi}{2} n_G f_G$$

where $r_G$ is a core radius of graded-index optical element 204, $NA_G$ is a numerical aperture of graded-index optical element 204, and $n_G$ is a refractive index of graded-index optical element 204. Here, the value given for $L_G$ is the quarter-pitch length.

In some implementations, fiber telescope 203 (i.e., the set of graded-index optical elements 204) may magnify the laser output to increase a spot size and decrease an NA at an exit facet of delivery fiber 104. For example, the set of graded-index optical elements 204 may magnify the laser output of laser source 101 comprising multiple laser modules 102, which increases a spot size and a lowers an NA at an exit facet of delivery fiber 104 (e.g., as compared to using a delivery fiber that does not include fiber telescope 203). In some implementations, the combination of focal lengths of graded-index optical elements 204 may be selected to match an NA of the laser source 101 comprising the multiple laser modules 102 to an NA of a laser source 101 including a single laser module 102.

Figure 3A:
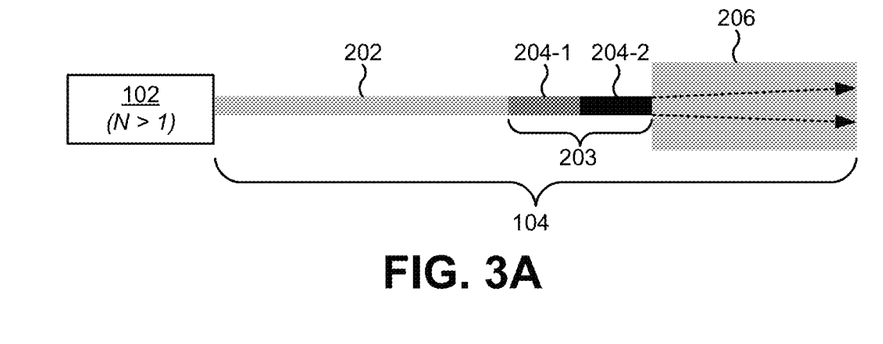
FIGS. 3A and 3B are diagrams illustrating an example in which focal lengths of graded-index optical elements are selected to match a numerical aperture (NA) of a laser source comprising multiple laser modules to an NA of a laser source including a single laser module.
Figure 3B:
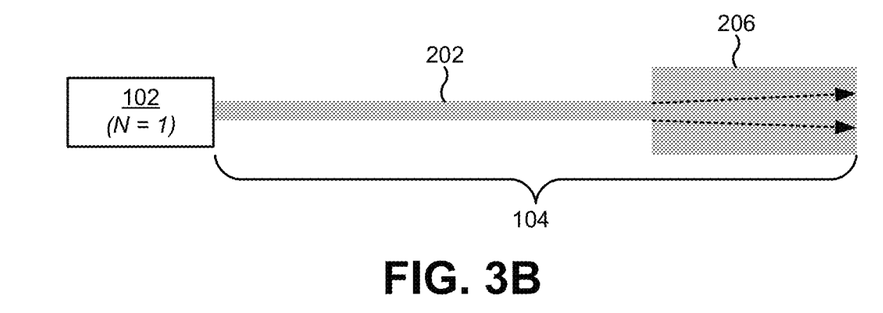

FIGS. 3A and 3B are diagrams illustrating an example in which focal lengths of graded-index optical elements 204 are selected to match an NA of a laser source 101 comprising multiple laser modules 102 to an NA of a laser source 101 including a single laser module 102. As shown in FIG. 3A, delivery fiber 104 coupled to laser source 101 comprising the multiple laser modules 102 includes a set of graded-index optical elements 204 while, as shown in FIG. 3B, a delivery fiber coupled to laser source 101 comprising the single laser module 102 includes only optical waveguide 202. As illustrated in FIGS. 3A and 3B, the inclusion of fiber telescope 203 in delivery fiber 104 enables the use of endcaps 206 having the same length and, hence, the same mechanical components, tolerances, or the like, can be used when providing a connector termination of the delivery fibers of both the laser source 101 comprising a single laser module 102 and the laser source 101 comprising multiple laser modules 102 (despite their being significantly different laser sources).

As indicated above, FIGS. 3A and 3B are provided merely as examples. Other examples may differ from what is described with regard to FIGS. 3A and 3B.

Alternatively, in some implementations, fiber telescope 203 may de-magnify the laser output to decrease a spot size and increase an NA at an exit facet of delivery fiber 104. For example, the set of graded-index optical elements 204 may de-magnify the laser output of laser source 101 comprising the single laser module 102, which decreases a spot size and increases an NA at an exit facet of delivery fiber 104 (e.g., as compared to using a delivery fiber that does not include fiber telescope 203). In some implementations, the combination of focal lengths of graded-index optical elements 204 may be selected to match an NA of the laser source 101 comprising the single laser module 102 to an NA of a laser source 101 including multiple laser modules 102.

Figure 4A:
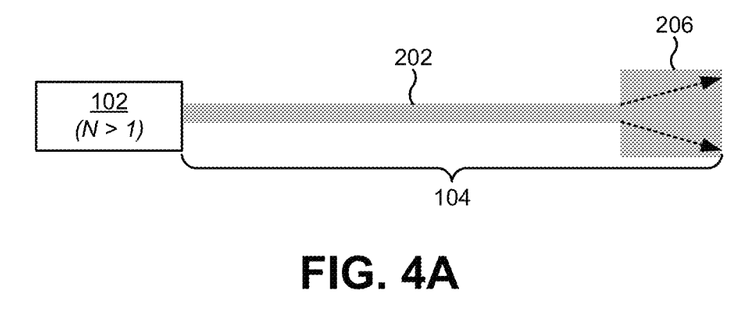
FIGS. 4A and 4B are diagrams illustrating an example in which focal lengths of graded-index optical elements are selected to match an NA of a laser source comprising a single laser module to an NA of a laser source including multiple laser modules.
Figure 4B:
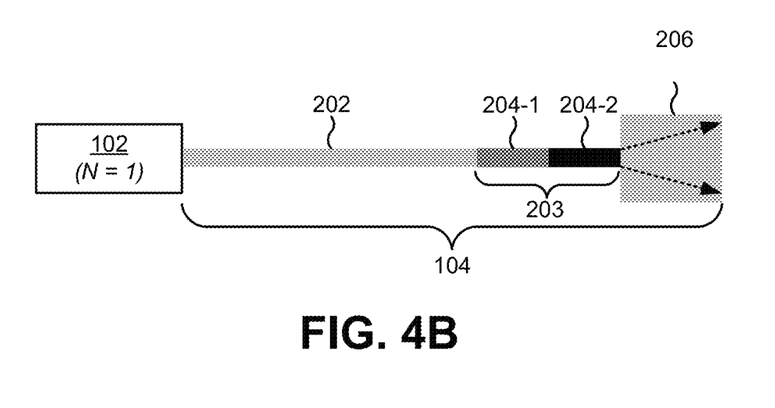

FIGS. 4A and 4B are diagrams illustrating an example in which focal lengths of graded-index optical elements 204 are selected to match an NA of a laser source 101 comprising a single laser module 102 to an NA of a laser source 101 including multiple laser modules 102. As shown in FIG. 4B, delivery fiber 104 coupled to laser source 101 comprising the single laser module 102 includes a set of graded-index optical elements 204 while, as shown in FIG. 4A, a delivery fiber coupled to laser source 101 comprising the multiple laser modules 102 includes only optical waveguide 202. As illustrated in FIGS. 4A and 4B, the inclusion of fiber telescope 203 in delivery fiber 104 enables the use of endcaps 206 having the same length and, hence, the same mechanical components, tolerances, or the like, can be used when providing a connector termination of the delivery fibers of both the laser source 101 comprising a single laser module 102 and the laser source 101 comprising multiple laser modules 102.

As indicated above, FIGS. 4A and 4B are provided merely as examples. Other examples may differ from what is described with regard to FIGS. 4A and 4B.

In some implementations, at least one of the set of graded-index optical elements 204 of fiber telescope 203 may be a non-quarter pitch graded-index lens. For example, rather than using ¼ pitch lengths needed to utilize the set of graded-index optical elements 204 as graded-index lenses for making a perfectly imaging telescope, a length of one or more of the set of graded-index optical elements 204 could be different from the ¼ pitch length (e.g., shorter or longer than the ¼ pitch length). Here, the non-quarter pitch length achieves imperfect imaging, which could be advantageous to material processing. For example, non-quarter pitch lengths could be used to shift an image plane relative to a caustic waist of the imaged beam (e.g., to enhance material processing characteristics of the beam on the workpiece).

Figure 5A:
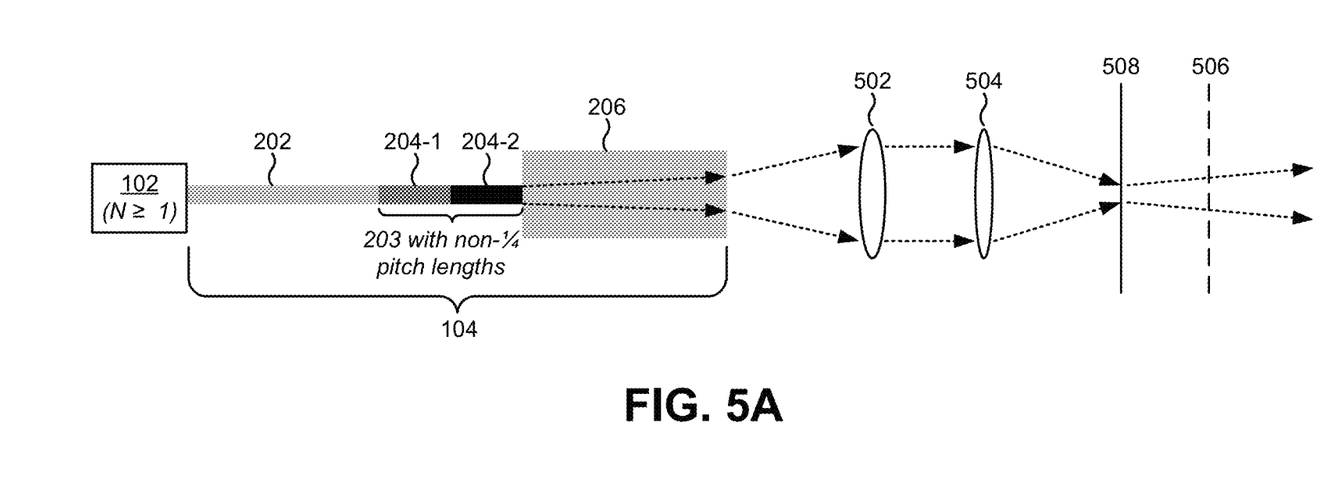
FIGS. 5A and 5B are diagrams illustrating examples associated with using non-quarter pitch graded-index optical elements in a fiber telescope to achieve imperfect imaging.
Figure 5B:
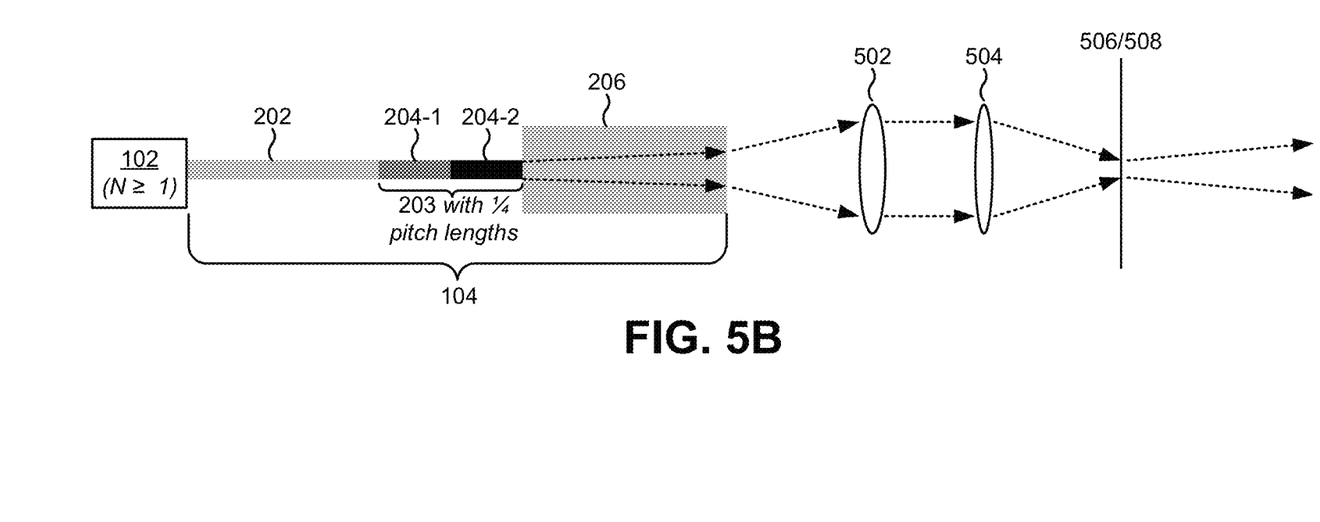

FIGS. 5A and 5B are diagrams illustrating examples associated with using non-quarter pitch graded-index optical elements 204 in fiber telescope 203 to achieve imperfect imaging. In FIG. 5A, at least one non-quarter pitch graded-index optical element 204 is used in order to achieve imperfect imaging. For example, as shown in FIG. 5A, after transmission through delivery fiber 104 (e.g., optical waveguide 202, graded-index optical element 204-1, graded-index optical element 204-2, endcap 206) and a set of lenses (e.g., lens 502 and lens 504 included in, for example, processing head 106), an image plane 506 is shifted relative to a caustic waist 508 of the imaged beam. In some implementations, the amount of shift of the image plane can be controlled through selection of the non-quarter pitch lengths of one or more of the set of graded-index optical elements 204. This contrasts with FIG. 5B, in which quarter-pitch graded-index optical elements 204 are used to achieve perfect imaging. As shown, after transmission through delivery fiber 104 and the set of lenses, image plane 506 is aligned with caustic waist 508 of the imaged beam.

As indicated above, FIGS. 5A and 5B are provided merely as examples. Other examples may differ from what is described with regard to FIGS. 5A and 5B.

The techniques and apparatuses described herein also have implications for processing heads 106 used in, for example, a kW cutting and/or welding application. Such processing heads 106 are, in general, configured to image a laser output (e.g., provided by a laser source 101 comprising a single laser module, or a laser source 101 comprising multiple laser modules 102) onto a workpiece using a set of optical components (e.g., including one or more lenses, curved mirrors, and/or the like). In some implementations, the focal lengths of these optical components are chosen to be optimized for the divergence of laser light being used. Therefore, it may be necessary to have different optical configurations, depending on the input beam. However, by modifying the laser light on delivery fiber 104 with fiber telescope 203 as described above, the same processing head may be utilized for both the laser source 101 comprising a single laser module and the laser source 101 comprising multiple laser modules 102.

Having to utilize different lenses in a processing head 106 for different laser sources adds complexity to the design of processing head 106 and results in a need for different models. Further, along with these lenses, there are often apertures and other optical elements in a front end of processing head 106 which also need to be tailored to match the divergence of the laser beam. However, by using a delivery fiber 104 including a fiber telescope 203, the divergence of light from a laser source 101 comprising multiple laser modules 102 can be matched to a divergence of light from a laser source 101 comprising a single laser module 102. In other words, in some implementations, focal lengths of the set of graded-index optical elements 204 can be selected to achieve a particular divergence of the laser output. Thus, a single processing head front end can be used to support both of these types of laser sources 101 (provided that power densities are accounted for).

Figure 6A:
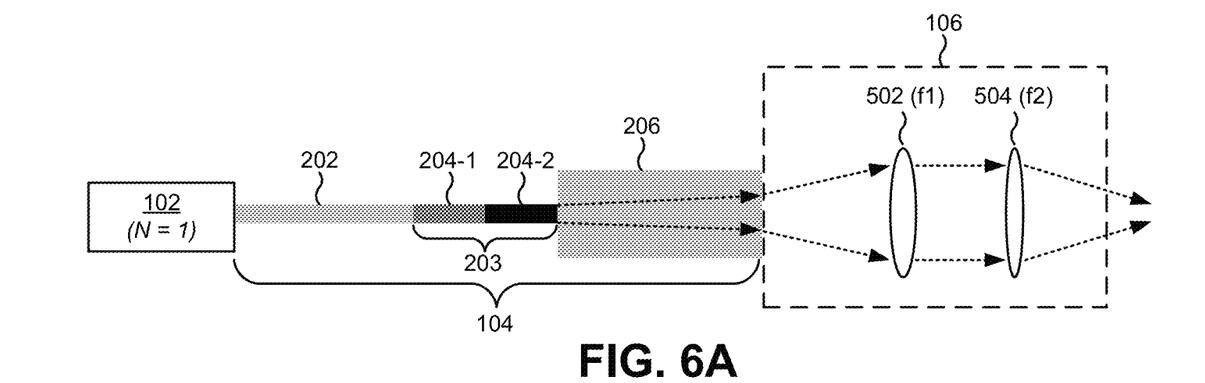
FIGS. 6A and 6B are diagrams illustrating an example in which graded-index optical elements are used to match a divergence of light from a laser source comprising a single laser module to a divergence of a laser source including multiple laser modules.
Figure 6B:
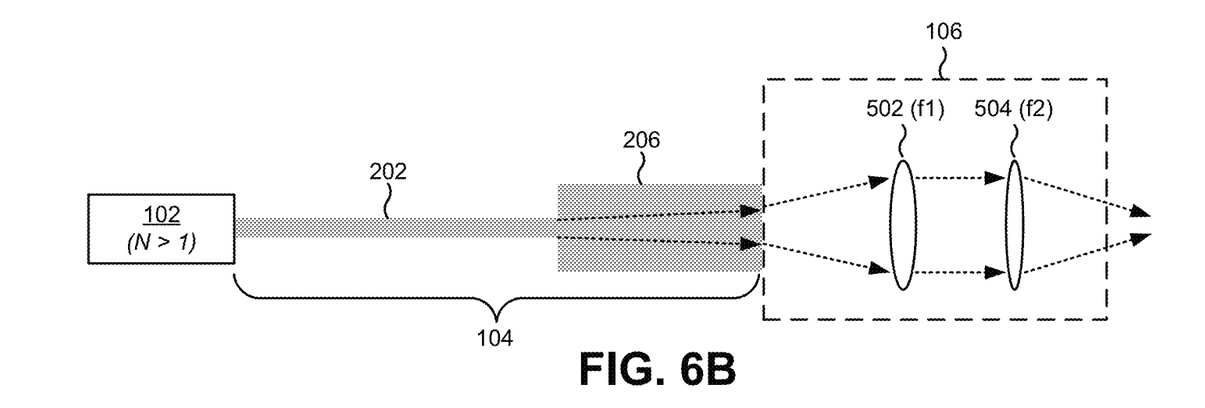

FIGS. 6A and 6B are diagrams illustrating an example in which graded-index optical elements 204 are used to match a divergence of light from a laser source 101 comprising a single laser module 102 to a divergence of a laser source 101 including multiple laser modules 102. As shown in FIG. 6A, delivery fiber 104 coupled to laser source 101 comprising the single laser module 102 includes a set of graded-index optical elements 204 while, as shown in FIG. 6B, a delivery fiber coupled to laser source 101 comprising the multiple laser modules 102 includes only optical waveguide 202. As illustrated in FIGS. 6A and 6B, fiber telescope 203 causes the divergence of the light provided by the single laser module 102 to match the divergence of the light provided by the multiple laser modules 102 (after transmission via endcap 206) and, hence, the same configuration of processing head 106 can be used for both the laser source 101 comprising a single laser module 102 and the laser source 101 comprising multiple laser modules 102. In operation, lens 504 (e.g., a focusing lens) may be changed depending on the required conditions on the workpiece. Thus, this section of processing head 106 may need flexibility. In some implementations, the flexibility to change lens 504 can be utilized to account for change in spot size on the workpiece that results from use of fiber telescope 203.

As indicated above, FIGS. 6A and 6B are provided merely as examples. Other examples may differ from what is described with regard to FIGS. 6A and 6B.

In some implementations, the set of graded-index optical elements 204 may be used to adjust a spot size of the laser beam prior to imaging through processing head 106. For example, in some processing heads 106, there may not be an adequate available range of magnifications (e.g., if selection of available lenses is limited or if physical construction of processing head 106 does not permit certain desired magnifications). In such cases, fiber telescope 203 can be used to create a larger or smaller spot size at a fiber tip, thereby providing an extended range of output spot sizes upon the workpiece.

Figure 7:
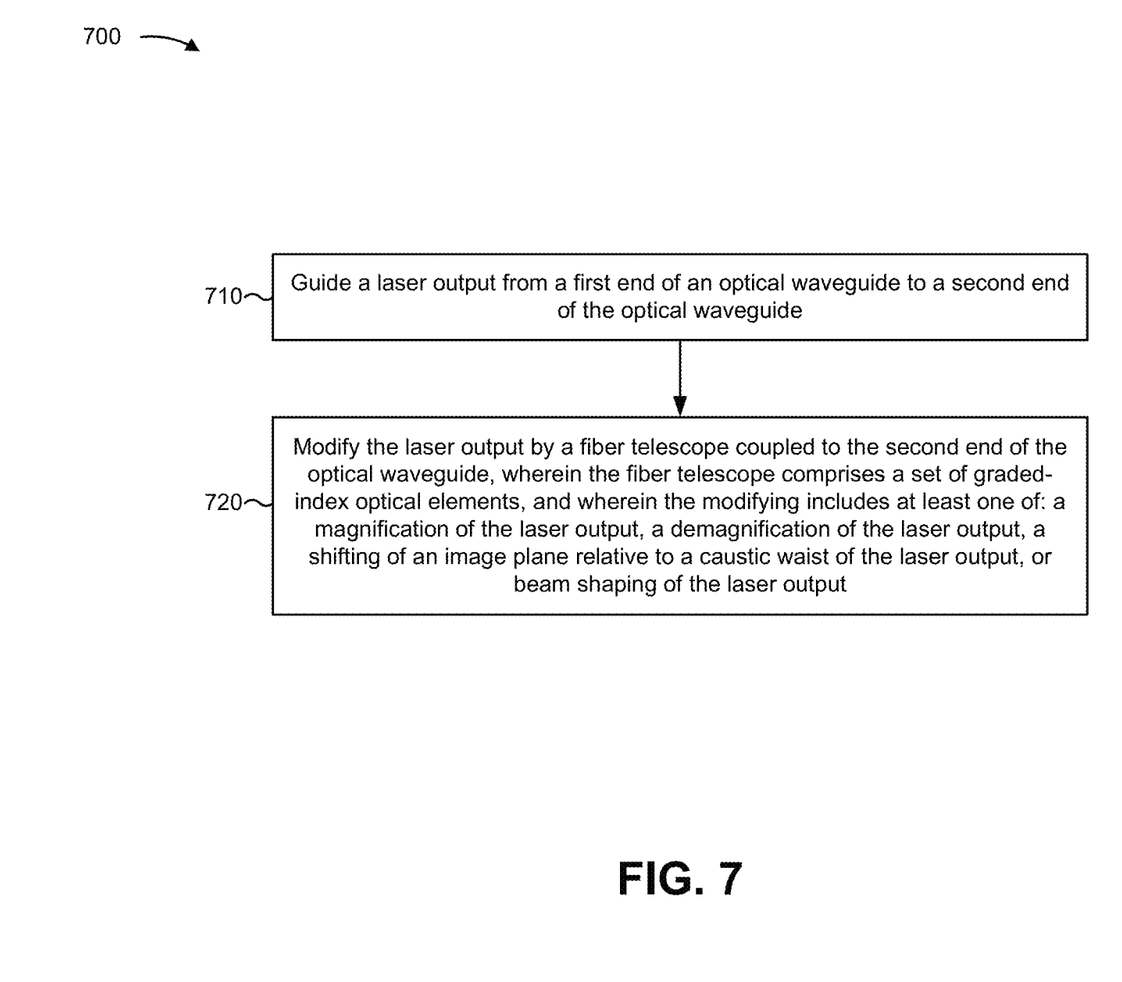
FIG. 7 is a flowchart of example processes for modifying a laser output of a laser source using a fiber telescope included in a delivery fiber, as described herein.

FIG. 7 is a flowchart of example processes 700 for modifying a laser output of a laser source using a fiber telescope included in a delivery fiber. In some implementations, one or more process blocks of FIG. 7 may be performed by one or more components of an optical fiber device (e.g., delivery fiber 104).

As shown in FIG. 7, process 700 may include guiding a laser output from a first end of an optical waveguide to a second end of the optical waveguide (block 710). For example, the optical fiber device may guide a laser output from a first end of an optical waveguide (e.g., optical waveguide 202) to a second end of the optical waveguide, as described above.

As further shown in FIG. 7, process 700 may include modifying the laser output by a fiber telescope coupled to the second end of the optical waveguide (block 720). For example, the optical fiber device may modify the laser output by a fiber telescope (e.g., fiber telescope 203) coupled to the second end of the optical waveguide, as described above. In some implementations, the fiber telescope comprises a set of graded-index optical elements (e.g., a first graded-index optical element 204-1) and a second graded-index optical element 204-2). In some implementations, the modifying includes at least one of: a magnification of the laser output, a demagnification of the laser output, a shifting of an image plane relative to a caustic waist of the laser output, or beam shaping of the laser output.

Process 700 may include additional implementations, such as any single implementation or any combination of implementations described below and/or in connection with one or more other processes described elsewhere herein.

In a first implementation, the set of graded-index optical elements have approximately parabolic refractive-index profiles.

In a second implementation, the set of graded-index optical elements includes a first graded-index optical element and a second graded-index optical element, where the first and second graded-index optical elements are quarter-pitch graded-index lenses.

In a third implementation, the optical fiber device includes an endcap (e.g., endcap 206) fused to a second facet of the set of graded-index optical elements.

In a fourth implementation, the laser output is provided by a single module laser (e.g., laser module 102).

In a fifth implementation, the fiber telescope is to de-magnify the laser output in order to decrease a spot size and increase a numerical aperture at an exit facet of the optical fiber device.

In a sixth implementation, the set of graded-index optical elements includes a first graded-index optical element and a second graded-index optical element, where focal lengths of the first graded-index optical element and the second graded-index optical element are selected to cause an NA of a single module laser (e.g., a single laser module 102) to match an NA of an engine including a plurality of laser modules (e.g., a plurality of laser modules 102).

In a seventh implementation, the laser output is provided by an engine including a plurality of fiber laser modules (e.g., laser modules 102-1 through 102-N).

In an eighth implementation, the fiber telescope is to magnify the laser output in order to increase a spot size and decrease an NA at an exit facet of the optical fiber device.

In a ninth implementation, the set of graded-index optical elements includes a first graded-index optical element and a second graded-index optical element, where focal lengths of the first graded-index optical element and the second graded-index optical element are selected to cause an NA of an engine including a plurality of laser modules (e.g., a plurality of laser modules 102) to match an NA of a single laser module (e.g., a single laser module 102).

In a tenth implementation, at least one graded-index optical element of the set of graded-index optical elements is a non-quarter pitch graded-index lens.

In an eleventh implementation, the fiber telescope is to shift an image plane relative to a caustic waist of the laser output in association with achieving imperfect imaging.

In a twelfth implementation, the set of graded-index optical elements includes a first graded-index optical element and a second graded-index optical element, where focal lengths of the first graded-index optical element and the second graded-index optical element are selected to achieve a particular divergence of the laser output.

In a thirteenth implementation, a total length of the set of graded-index optical elements is greater than one-quarter pitch.

In a fourteenth implementation, a length of at least one graded-index optical element of the set of graded-index optical elements is one-quarter pitch.

In a fifteenth implementation, a length of at least one graded-index optical element of the set of graded-index optical elements is greater than or less than on one-quarter pitch.

In a sixteenth implementation, the set of graded-index optical elements includes at least three graded-index optical elements.

In a seventeenth implementation, at least two of the set of graded-index optical elements have a same diameter and a same graded-index profile and are formed of a monolithic piece of graded-index material.

In an eighteenth implementation, the set of graded-index optical elements includes a graded-index element in which a graded-index profile varies as a function of position along a fiber axis. This may cause the effective focal length to vary with position. In some implementations, a method for fabricating a fiber with an axially varying graded-index profile may include fusion-tapering the fiber.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a delivery fiber 104 comprising an optical waveguide 202 to guide a laser output, and a fiber telescope 203 optically coupled to the optical waveguide 202 to modify the laser output. In some implementations, the fiber telescope 203 may include a pair of graded-index optical elements 204. In some implementations, the modification by fiber telescope 203 may include a magnification of the laser output, a demagnification of the laser output, a shifting of an image plane relative to a caustic waist of the laser output, or beam shaping of the laser output, as described above.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   guiding a laser output from a first end of an optical waveguide to a second end of the optical waveguide; and
   modifying the laser output by a fiber telescope coupled to the second end of the optical waveguide,
      wherein the fiber telescope comprises a set of graded-index optical elements comprising:
         a first graded-index optical element having a first core radius, and
         a second graded-index optical element having a second core radius that is different from the first core radius,
      wherein a diameter of the fiber telescope matches a diameter of the optical waveguide at the second end of the optical waveguide and
      wherein the modifying includes at least one of:
         a magnification of the laser output,
         a demagnification of the laser output,
         a shifting of an image plane relative to a caustic waist of the laser output, or
         beam shaping of the laser output.

2. The method of claim 1, wherein the first graded-index optical element and the second graded-index optical element have substantially parabolic refractive-index profiles.

3. The method of claim 1, wherein a total length of the set of graded-index optical elements is greater than one-quarter pitch.

4. The method of claim 1, wherein the set of graded-index optical elements includes a graded-index optical element in which a graded-index profile varies as a function of position along a fiber axis.

5. The method of claim 1, wherein a first facet of the first graded-index optical element is fused to the second end of the optical waveguide.

6. The method of claim 1, further comprising:
reducing a power density of the laser output via an endcap fused to the fiber telescope.

7. The method of claim 1, wherein the fiber telescope comprises cladding surrounding the set of graded-index optical elements.

8. A method comprising:
guiding a laser output from a first end of an optical waveguide to a second end of the optical waveguide; and
modifying the laser output by a fiber telescope coupled to the second end of the optical waveguide,
wherein the fiber telescope comprises a set of graded-index optical elements comprising:
a first graded-index optical element having a first numerical aperture, and
a second graded-index optical element having a second numerical aperture that is different from the first numerical aperture,
wherein a diameter of the fiber telescope matches a diameter of the optical waveguide at the second end of the optical waveguide, and
wherein the modifying includes at least one of:
decreasing a spot size of the laser output,
increasing the spot size,
increasing a numerical aperture at an exit facet of the fiber telescope,
decreasing the numerical aperture,
shifting of an image plane relative to a caustic waist of the laser output, or
causing divergence of the laser output.

9. The method of claim 8, wherein the first graded-index optical element and the second graded-index optical element have substantially parabolic refractive-index profiles.

10. The method of claim 8, wherein the first graded-index optical element has a first core radius that is different from a second core radius of the second graded-index optical element.

11. The method of claim 8, wherein at least one of the set of graded-index optical fibers is a non-quarter pitch graded-index lens.

12. The method of claim 8, wherein the set of graded-index optical elements includes a graded-index element in which a graded-index profile varies as a function of position along a fiber axis.

13. The method of claim 8, wherein a first facet of the first graded-index optical element is fused to the second end of the optical waveguide.

14. The method of claim 8, wherein modifying the laser output comprises:
causing the numerical aperture to match a numerical aperture of an engine including a plurality of laser modules.

15. A method comprising:
guiding a laser output from a first end of an optical waveguide to a second end of the optical waveguide; and
modifying the laser output by a fiber telescope coupled to the second end of the optical waveguide,
wherein the fiber telescope comprises a set of graded-index optical elements comprising:
a first graded-index optical element having a first numerical aperture, and
a second graded-index optical element having a second numerical aperture that is different from the first numerical aperture,
wherein the fiber telescope comprises cladding surrounding the set of graded-index optical elements, and
wherein diameter of the fiber telescope is constant along its length; and
reducing a power density of the laser output by an endcap fused to at least one of the set of graded-index optical elements.

16. The method of claim 15, wherein the set of graded-index optical elements includes a graded-index element in which a graded-index profile varies as a function of position along a fiber axis.

17. The method of claim 15, wherein modifying the laser output includes at least one of:
magnifying the laser output,
demagnifying the laser output,
shifting an image plane relative to a caustic waist of the laser output, or
beam shaping the laser output.

18. The method of claim 15, wherein modifying the laser output includes at least one of:
decreasing a spot size of the laser output,
increasing the spot size,
increasing a numerical aperture at an exit facet of the fiber telescope,
decreasing the numerical aperture,
shifting of an image plane relative to a caustic waist of the laser output, or
causing divergence of the laser output.

19. The method of claim 15, wherein modifying the laser output includes:
causing a numerical aperture of a single module laser to match a numerical aperture of an engine including a plurality of laser modules.

20. The method of claim 15, wherein modifying the laser output includes:
causing a numerical aperture of an engine of including a plurality of lasers to match a numerical aperture of a single laser module.

* * * * *